US008284949B2

(12) United States Patent
Farhang et al.

(10) Patent No.: US 8,284,949 B2
(45) Date of Patent: Oct. 9, 2012

(54) MULTI-CHANNEL ACOUSTIC ECHO CANCELLATION SYSTEM AND METHOD

(75) Inventors: Behrouz Farhang, Salt Lake City, UT (US); Harsha I. K. Rao, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 635 days.

(21) Appl. No.: 12/403,938

(22) Filed: Mar. 13, 2009

(65) Prior Publication Data

US 2009/0262950 A1 Oct. 22, 2009

Related U.S. Application Data

(60) Provisional application No. 61/045,885, filed on Apr. 17, 2008.

(51) Int. Cl.
*H04B 3/20* (2006.01)
*H04M 9/08* (2006.01)

(52) U.S. Cl. ................ 381/66; 379/406.08; 379/406.09; 370/286

(58) Field of Classification Search ..................... 381/66
See application file for complete search history.

(56) References Cited

U.S. PATENT DOCUMENTS 5,828,756 A 10/1998 Benesty et al.
6,895,093 B1 * 5/2005 Ali .................................. 381/66
6,950,513 B2 * 9/2005 Hirai et al. ............... 379/406.11
7,068,798 B2 6/2006 Hugas et al.
2003/0026437 A1 2/2003 Janse et al.

OTHER PUBLICATIONS

Tokui (The paper appears in: Acoustics, Speech, and Signal Processing, 2003. Proceedings. (ICASSP '03). 2003 IEEE International Conference). Jill Kobashigawa (EE 491 Final Report, Spring 2005, University of Hawaii).*

Tokui (The paper appears in: Acoustics, Speech, and Signal Processing, 2003. Proceedings. (ICASSP '03). 2003 IEEE International Conference).*

Jivesh_LMS_Newton_algorithm_2006, IEEE, 2006.*

Robert (LMS-Newton adaptive filtering, Electronic Transactions on Numeric Analysis, vol. 4, pp. 14-36, Mar. 1996).*

Jill Kobashigawa (EE 491 Final Report, Spring 2005, University of Hawaii). Jill_lattice_predictor_posting_date.*

Farhang-Boroujueny, "Fast LMS/Newton Algorithms Based on Autoregressive Modeling and Their Application to Acoustic Echo Cancellation", IEEE Transactions on Signal Processing, vol. 45, No. 8, Aug. 1997.

Eneroth, "Stereophonic Acoustic Echo Cancelllation: Theory and Implementation", Lund University, 2001.

(Continued)

*Primary Examiner* — Matthew Landau
*Assistant Examiner* — Khaja Ahmad
(74) *Attorney, Agent, or Firm* — Fulbright & Jaworski L.L.P.

(57) ABSTRACT

Techniques for multi-channel acoustic echo cancellation include adaptive filtering. An adaptive filter can use a lattice predictor of order M coupled to an adaptive LMS/Newton filter of length N, wherein M<N. The lattice predictor can provide decorrelation of the input to the LMS/Newton filter and can provide faster convergence for the LMS/Newton filter. Efficient operation of the LMS/Newton filter can also be provided by using output from the lattice predictor to provide low complexity update of weights for the LMS/Newton filter.

20 Claims, 5 Drawing Sheets

OTHER PUBLICATIONS

Sondhi et al., Stereophonic Acoustic Echo Cancellation—An Overview of the Fundamental Problem, IEEE Signal Processing Letters, vol. 2, No. 8, Aug. 1995.

PCT/US2009/037184: International Search Report and Written Opinion of the International Searching Authority.

* cited by examiner

MULTI-CHANNEL ACOUSTIC ECHO CANCELLATION SYSTEM AND METHOD

The present application claims the benefit of U.S. Provisional Patent Application Ser. No. 61/045,885, filed Apr. 17, 2008, entitled "Multi-Channel Acoustic Echo Cancellation System and Method" which is hereby incorporated by reference in its entirety.

FIELD OF THE INVENTION

The present application relates to cancellation of acoustic echoes within an electronic system.

BACKGROUND

Many systems provide for the transmission of acoustic information from one place to another. One example is teleconferencing, where two conference rooms are linked using speakerphones and audio signals are communicated between the speakerphones using a communications network. Videoconferencing is another example, where both audio and video data is communicated.

One difficulty in teleconferencing systems is that acoustic echoes can be created from coupling between speakers and microphones located within the same vicinity. These echoes are not constant. As people and things within a room move, the echo response can change. While conventional teleconferencing systems have successfully included echo cancellation techniques, these techniques have typically been applied to single channel systems.

There is a desire, however, to increase the quality and realism of audio transmission in teleconferencing and similar applications. It is particularly of interest to provide increased spatial realism by using multiple channels (e.g., stereo). However, the use of multiple channels presents more subtle difficulties in performing echo cancellation. A single-channel acoustic echo cancellation system can obtain an accurate estimate of the echo response in a short period of time. In a multi-channel system, however, previous acoustic echo cancellation systems suffer from very slow modes of converge. This is because the audio inputs on the multiple channels tend to be very highly correlated. This can make convergence of the echo canceller slow and tracking of changes in the acoustic environments difficult. For example, a multi-channel system can operate between a transmitting room and a receiving room, where echoes are generated in the receiving room. When one person in the transmitting room stops talking and another person starts talking at a different location in the transmitting room, changes in the echo cancelling filters are needed, even though nothing has changed in the receiving room where the echoes are created.

It has been proposed to introduce noise and/or non-linearities into the transmission path to provide decorrelation between the audio channels. Unfortunately, such approaches can cause other difficulties, as audio quality can be reduced and/or spatial perception affected.

SUMMARY OF THE INVENTION

It has been recognized that it would be advantageous to develop a multi-channel acoustic echo cancellation that can provide improved performance while preserving sound quality.

In some embodiments of the invention, a multi-channel acoustic echo cancellation system can operate with a first acoustic space and a second acoustic space. A plurality of first microphones can be disposed within a first acoustic space and generate a plurality of first electronic signals derived from acoustic signals received from a first acoustic source within the first acoustic space. A plurality of speakers can be disposed within a second acoustic space and coupled to the plurality of first microphones to generate a plurality of second acoustic signals in the second acoustic space corresponding to the plurality of first electronic signals. A plurality of second microphones can be disposed within the second acoustic space and generate a plurality of second electronic signals. The second electronic signals can be derived from acoustic signals received from a second acoustic source within the second acoustic space and echoes of the plurality of second acoustic signals generated within the second acoustic space. An adaptive filter can be coupled to the plurality of second microphones and configured to adaptively filter the plurality of second electronic signals to form a plurality of echo-reduced second electronic signals using the plurality of first electronic signals as a reference. The adaptive filter can include a lattice predictor of order M coupled to an LMS/Newton adaptive filter of length N, wherein $M<N$.

In some embodiments of the invention, a multi-channel acoustic echo cancellation system can include means for forming the first electronic signals derived from acoustic signals in a first acoustic space, means for converting the first electronic signals into acoustic signals in a second acoustic space, means for forming second electronic signals derived from acoustic signals in the second acoustic space, and means for performing an adaptive filtering operation to reduce echoes generated within the second acoustic space. The means for performing an adaptive filtering operation can include means for forming a plurality of decorrelated signals using the plurality of first electronic signals as a reference input, and a means for using the plurality of decorrelated signals in a LMS/Newton adaptive filter to form a plurality of echo-reduced second electronic signals.

In some embodiments of the invention, a method for multi-channel acoustic echo cancellation is provided. The method can include forming a plurality of first electronic signals by transducing a plurality of acoustic signals received at a plurality of differing locations within a first acoustic space. The acoustic signals can be received from a first acoustic source within the first acoustic space. Another operation of the method can be converting each of the plurality of first electronic signals into a corresponding one of a plurality of second acoustic signals. The second acoustic signals can be converted at a plurality of differing locations within a second acoustic space that is different from the first acoustic space. A plurality of second electronic signals can be formed by transducing second acoustic signals received at a plurality of differing locations within the second acoustic space. The second acoustic signals can include acoustic signals received from a second acoustic source within the second acoustic space and echoes of the plurality of second acoustic signals within the second acoustic space. The method can also include performing an adaptive filtering operation on the plurality of second electronic signals using the plurality of first electronic signals as a reference input to form a plurality of echo-reduced second electronic signals. The adaptive filtering operation can include forming a plurality of decorrelated signals using a lattice predictor and using the plurality of decorrelated signals in a LMS/Newton adaptive filter.

BRIEF DESCRIPTION OF THE DRAWINGS

Additional features and advantages of the invention will be apparent from the detailed description which follows, taken in conjunction with the accompanying drawings, which together illustrate, by way of example, features of the invention.

DETAILED DESCRIPTION

Figure 1:
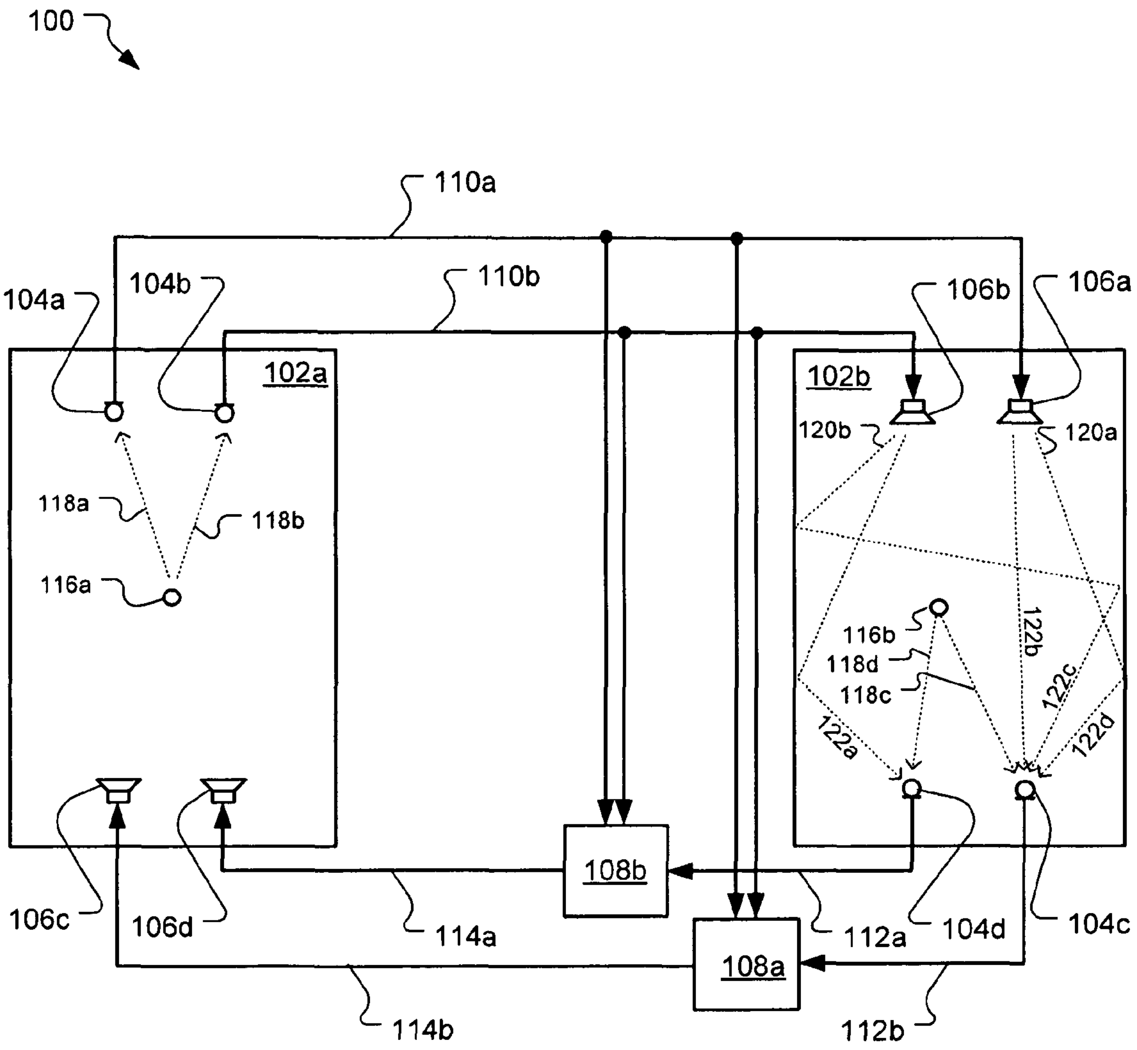
FIG. 1 is a block diagram of a teleconferencing system having multi-channel echo cancellation in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

As used herein "correlation" refers to the mathematic relationship of two processes or signals. For example, correlation can be defined as the expectation of the product of two signals. Correlation can be estimated or calculated using various techniques. Correlation between signals can be calculated with a time offset between the signals introduced. Correlation can be expressed as a percentage that is normalized to a peak correlation value or normalized to a power of one or both of the signals. Correlation between a signal and itself can be referred to as autocorrelation, and correlation between two different signals can be referred to as cross correlation.

The singular forms "a," "an," and "the" include plural referents unless the context clearly dictates otherwise. Thus, for example, reference to a microphone includes reference to one or more microphones.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

By the term "substantially" is meant that the recited characteristic, parameter, value, or arrangement need not be duplicated or achieved exactly, but that deviations or variations, including for example, tolerances, measurement error, measurement accuracy limitations, random natural variations, and other factors known to those of skill in the art, may occur in amounts that do not preclude the effect or function that was intended to be provided.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "less than or equal to 5" should be interpreted to include not only the explicitly recited value of 5, but also include individual values and sub-ranges within the indicated range. Thus, included in this numerical range are individual values such as 2, 3, and 4 and sub-ranges such as 1 to 3, 2 to 4, and 3 to 5, etc.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Within the figures, similar elements are designated using like numerical references, with individual instances distinguished by appended letters. For example, particular instances of an element 10 may be designated as 10*a*, 10*b*, etc. When similar elements are designated using like numerical references, it is to be appreciated that individual instances of an elements need not be exactly alike, as individual instances may have variations from each other that do not change their functioning within the application as described.

Tuning to embodiments of the present invention, improved techniques for multi-channel acoustic echo cancellation have been developed. While multi-channel acoustic echo cancellation may appear to be a straightforward extension of single-channel acoustic echo cancellation techniques, the problem is significantly more complex. As mentioned above, one complication is caused by the highly correlated signals on the various channels of the system. For example, cross correlation of the signals obtained from microphones within the same acoustic space may exceed 25%, 50%, or even 90% (relative to normalized power of the signals). While introducing non-linearity into the channels can reduce the correlation, this can have attendant side effects, such as reduction in audio quality. In contrast, some embodiments of the present invention rely on linear techniques, which can help to preserve the quality of the acoustic signals.

It has been observed that the input signals to the adaptive filters can be modeled as relatively low order autoregressive processes. Through the use of a multi-channel gradient lattice algorithm, a few stages of a lattice predictor are sufficient to generate decorrelated signals. The decorrelated signals can then be used within the adaptive filter for efficiently estimating the echo response. For example, a relatively low complexity least mean squares (LMS)/Newton algorithm can be formed as described herein. The low complexity LMS/Newton algorithm disclosed herein can be implemented with only slightly higher computational complexity than normalized least-mean-squares and significantly lower computational complexity than recursive least squares or a direct implementation of the LMS/Newton algorithm. Accordingly, some embodiments of the invention can be practically employed within low cost systems. By avoiding the introduction of non-linearities into the system, quality of the acoustic signals can be maintained.

FIG. 1 illustrates a teleconferencing system in which acoustic echo cancellation can be implemented in accordance with some embodiments of the present invention. The teleconferencing system 100 can operate between a first acoustic space 102*a* and a second acoustic space 102*b*. For example, the acoustic spaces can be conference rooms or offices. The acoustic signals can be speech signals generated by participants in a teleconference.

The system 100 can include a plurality of first microphones 104*a*, 104*b* disposed within the first acoustic space. The microphones can be located at different positions and can convert acoustic signals into electronic signals 110*a*, 110*b*. For example, the microphones can convert acoustic signals received from one or more first acoustic sources 116*a* in the first acoustic space into a plurality of corresponding electronic signals. The acoustic signal can, for example, be sound energy from a human talker. The acoustic signal can travel over different paths 118*a*, 118*b* to the microphones.

Although only two microphones 104*a*, 104*b* are shown (e.g., a stereo system), it is to be understood that more than two microphones can be used. In general, the microphones can be any type of acoustic-to-electronic transducers, as the type of microphone is not essential to the invention. The microphones do not need to be of the same type or have the same performance, although using microphones having similar frequency responses and gain can be beneficial.

The first microphones 104*a*, 104*b* can be coupled to a plurality of first speakers 106*a*, 106*b* disposed within the second acoustic space 102*b*. The first speakers can generate a second plurality of acoustic signals 120*a*, 120*b* corresponding to the plurality of first electronic signals. In general, the speakers can be any type of electronic-to-acoustic transducers, as the type of speaker is not essential to the invention. The speakers do not need to be of the same type or have the same performance, although using speakers having similar frequency responses and gain can be beneficial. The speakers can, for example, be positioned similarly to the microphones in the first acoustic space, to provide stereo imaging.

A plurality of second microphones 104*c*, 104*d* are also disposed in the second acoustic space 102*b*, and thus receive acoustic signals from one or more second acoustic sources 116*b* in the second acoustic space. The acoustic signals can travel over different paths 118*c*, 118*d* from the acoustic source to the microphones. The microphones can also receive echoes 122*a*, 122*b*, 122*c*, 122*d* of the plurality of second acoustic signals generated by the plurality of first speakers. The second microphones generate a plurality of second electronic signals 112*a*, 112*b* derived from the received acoustic signals.

The system can also include a plurality of adaptive filters 108*a*, 108*b*, each filter coupled to the plurality of second microphones 104*c*, 104*d* and configured to adaptively filter one of the plurality of second electronic signals 112*a*, 112*b* to form an echo-reduced second electronic signal 114*a*, 114*b*. The adaptive filters can each include a multi-channel lattice predictor of order M coupled to an LMS/Newton filter of length N, wherein $M<N$. In particular, M can be significantly less than N, for example, M may be one-tenth, or even one-hundredth the size of N. As a particular example, the lattice predictor can have an order much less than the length of the LMS/Newton filter. As a particular example, the lattice predictor can have an order of $M\leqq 10$, and the LMS/Newton filter can have an order of about $L\geqq 500$.

The echo-reduced second electronic signals 114*a*, 114*b* can be provided to a plurality of second speakers 106*c*, 106*d* disposed within the first acoustic space 102*a*. The plurality of second speakers can convert the echo-reduced second electronic signals into acoustic signals within the first acoustic space.

The teleconferencing system 100 just described can be referred to as a one-way echo cancelling system. This is because the system can cancel echoes of signals transmitted from acoustic space 102*a* to acoustic space 102*b* that are created in acoustic space 102*b*. These echoes would ordinarily be transmitted back to acoustic space 102*a*, and by removal or reduction of these echoes, improved system quality is obtained. Two-way echo cancelling can also be performed as explained in additional examples below.

Figure 2:
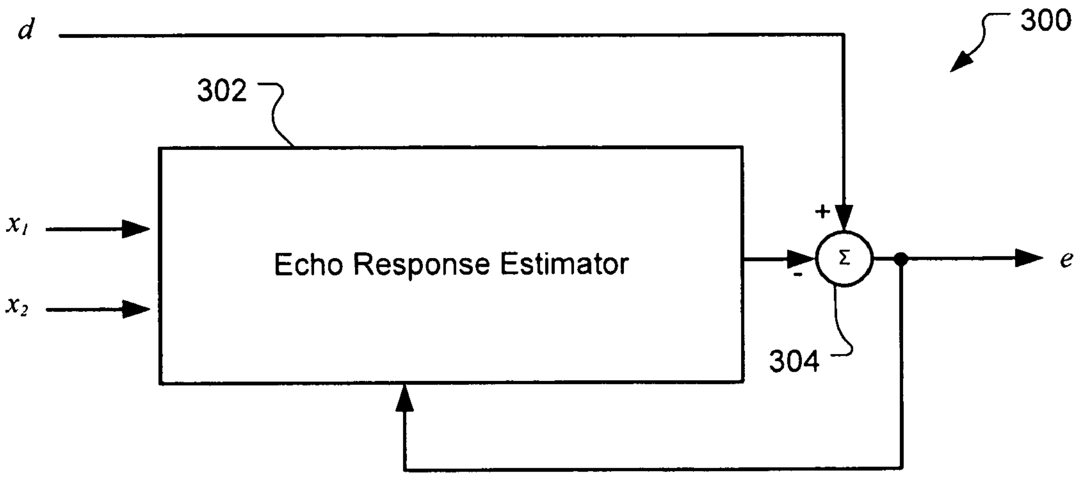
FIG. 2 is a block diagram of a two-channel adaptive filter suitable for multi-channel echo cancellation in accordance in accordance with some embodiments of the present invention.

An embodiment of a stereo adaptive filter 300 is illustrated in FIG. 2. The adaptive filter can accept reference inputs $x_1(n)$, $x_2(n)$, wherein n is the time index (e.g., sample time in a discrete time system). Inputs can, for example, correspond to signals 110*a*, 110*b* of FIG. 1. The inputs together can be viewed as a vector x(n). The adaptive filter can include an echo response estimator 302 to estimate echo y(n), wherein $y(n)=w^T(n)x(n)$, wherein $^T$ represents the vector transpose operation (or, in other words, by forming a dot product of the weight vector and the input vector). Using a subtractor (or an adder) 304, the echo cancelled output e(n) is thus given by $e(n)=d(n)-y(n)$, where d(n) is acoustic input including echo picked up by the microphones, for example signals, 112*a*, 112*b*. The output e(n) is the echo-cancelled signal, for example, signals 114*a*, 114*b*. The output e(n) can be fed back to the echo response estimator for use in adapting the echo response.

The estimation of the echo response can use an LMS/Newton algorithm, where the weights are updated as $w(n+1)=w(n)+\mu R_{xx}^{-1}x(n)e(n)$, wherein $R_{xx}$ is the autocorrelation matrix of the input x(n). Of course, $R_{xx}$ is not known exactly and therefore can be estimated. Further, because of the long length of the echo response, the dimension of $R_{xx}$ is quite large (e.g., 2N×2N), and therefore inverting the matrix is computationally impractical. The update can be expressed as $w(n+1)=w(n)+\mu u(n)e(n)$, wherein determining the vector u(n) represents the principle source of computational complexity.

Reduced complexity can, however, be obtained by using the fact than the input sequence speech signal can be effectively modeled as an autoregressive process of relatively low order, for example, order M, where M is much smaller than the input vector length N (N is the length of the adaptive filter or echo response). This results in an efficient way of determining the product $u(n)=R_{xx}^{-1}x(n)$ and avoids having to estimate and invert the correlation matrix $R_{xx}$.

Because the input sequence x(n) can be modeled as an autoregressive process, a lattice predictor can be used to provide backward prediction-error vector $b(n)=Lx(n)$, wherein L is a 2N×2N transformation matrix. Accordingly, it can be shown that $R_{xx}^{-1}=L^T R_{bb}^{-1} L$. By using a lattice predictor to obtain b(n) and solving for L, a much lower complexity approach to calculating the value $u(n)=L^T R_{bb}^{-1} Lx(n)=L^T R_{bb}^{-1} b(n)$ can therefore be realized.

Figure 3:
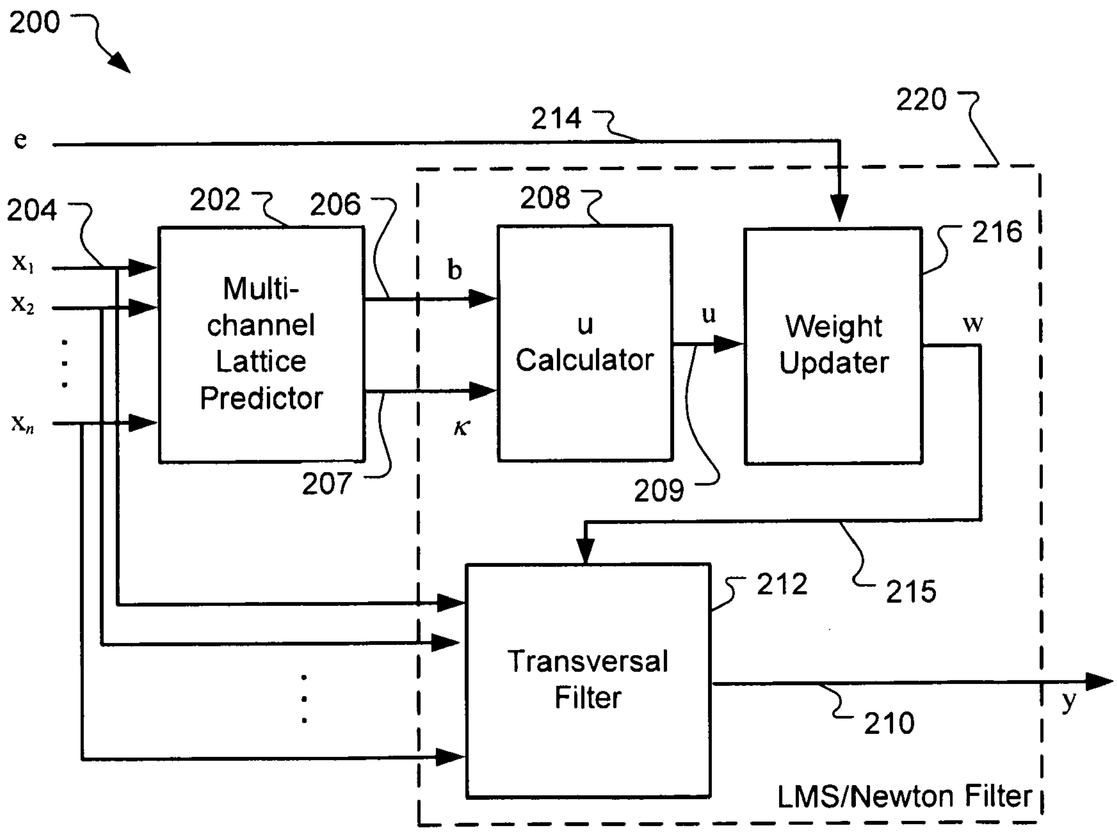
FIG. 3 is a detailed block diagram of an echo estimator suitable for use in an adaptive filter in accordance with some embodiments of the present invention.
Figure 4:
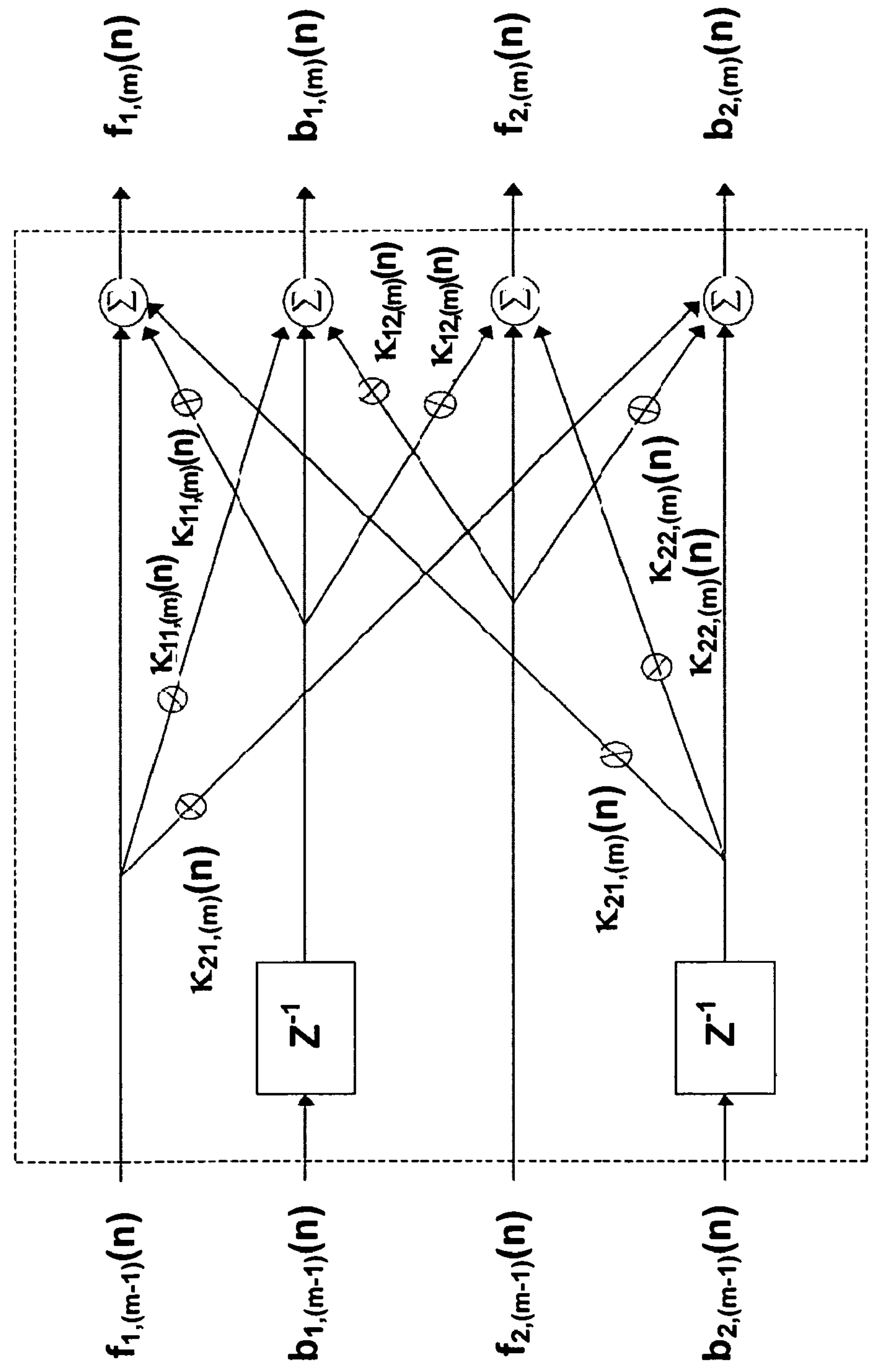
FIG. 4 is a block diagram of a cell of a lattice predictor suitable for use in an echo estimator in accordance with some embodiments of the present invention.

FIG. 3 provides an illustration of one implementation of an adaptive filter 200 in accordance with some embodiments of the present invention. A multi-channel lattice predictor 202 is coupled to an LMS/Newton filter 220. The multi-channel lattice predictor 202 can accept a plurality of reference signals $x_1, x_2, \ldots x_n$ 204 (e.g. first electronic signals 110*a*, 110*b*) and compute a backward prediction-error vector b 206 and reflection coefficients κ 207. The lattice predictor can include a cascade of lattice cells. For example, for a stereo system, a two-channel lattice predictor can be used as illustrated in FIG. 4. Initialization of the lattice predictor can be done as $b_{1;0}(n)=f_{1;0}(n)=x_1(n)$ and $b_{2;0}(n)=f_{2;0}(n)=x_2(n)$. The resulting set of b and f values can be viewed as a vector of backward prediction errors and a vector of forward prediction errors, respectively.

The reflection coefficients κ, can determined recursively using a gradient adaptive algorithm to minimize the instantaneous backward and forward prediction errors of the corresponding cell. For example, each cell can update coefficients for time n+1 based on coefficients for time n and the forward and backwards prediction errors.

The LMS/Newton filter 220 includes a transversal filter 212, weight updater 216, and u calculator 208. Efficient calculation of u(n) 209 can be performed by the u calculator block 208 as will now be described.

The vector b(n) is of a form where only the first 2(M+1) elements need to be updated for each sample, as the remaining elements are delayed versions of previously calculated elements. Unlike a single channel echo canceller, however, $R_{bb}$ is not a diagonal matrix. $R_{bb}$ is, however, block diagonal, and thus can be inverted relatively efficiently. Powers of the backward prediction-error vector can be computed recursively, and $R_{bb}^{-1}$ can be obtained by inverting M+1 matrices of size 2×2.

In computing the product of $R_{bb}^{-1}$ and b(n), additional savings can be obtained due to the structure of the L matrix and b(n) vector. Defining $u(n)=L^T R_{bb}^{-1} b(n)$, only the first 2(M+1) and last 2M elements of u(n) need to be computed. The remaining elements are delayed versions of the $(2M+1)^{th}$ and $(2M+2)^{th}$ elements. Further, the L matrix is a block lower triangular, and can be written a combination of 2×2 identity matrices and 2×2 backward error predictor coefficient matrices (and of course zero matrices). The elements of L can thus be estimated from the reflection coefficients using the two-channel Levinson-Durbin algorithm.

An even more computationally efficient approach can be obtained by applying an approximation, where the transposed backward predictor coefficients are used in reverse order to estimate the forward prediction errors. The resulting simplified coefficient update can thus be given by $w(n+1)=w(n)+\mu L_2 R_{bb}^{-1} L_1 x_E(n)e(n)$, wherein $x_E(n)$ is an extended version of x(n), and $L_1$ is of size (2M+2N) by 2(2M+N) and $L_2$ is of size 2N×2(M+N). In this case, the u vector is given by $u_a(n)=L_2 R_{bb}^{-1} L_1 x_E(n)$. It turns out that this can be obtained directly from the output of the forward prediction-error filter. To account for delay differences between the forward and backward filtering, the desired signal can be delayed by M samples to be properly time aligned with $u_a(n)$.

Following estimation of the u vector by the u calculator 208, the weights w 215 for the adaptive filter can be updated in the w update block 216, according to $w(n+1)=w(n)+\mu u(n)e(n)$, where u(n) 209 is either the exact or approximate calculated above, and e(n) is the echo-cancelled signal 214. The weights can then be provided to the transversal filter 212 to compute the estimated echo y 210 for the next sample.

These two approaches can thus be summarized as follows:

Approach 1 ("Exact"):

1. Run the lattice predictor of order M to determine reflection coefficients κ and backward prediction errors b.
2. If desired, create a normalization matrix $\Lambda=R_{bb}^{-1}$ based on the backward prediction error power.
3. Run a two-channel Levinson-Durbin recursion to convert the reflection coefficients to backward predictor coefficients of matrix L.
4. Shift/copy data to account for elements of u that are delayed versions of previously calculated elements of u.
5. Compute the first 2(M+1) elements of u using the top left portion of L ($L_{tl}$) from the first 2(2M+1) elements of b ($b_a$), normalized using Λ, $[u_{1,0}, u_{2,0}, u_{1,1}, u_{2,1}, \ldots, u_{1,M}, u_{2,M}]^T = L_{tl}^T b_h$.
6. Compute the last 2M elements of u using the bottom right portion of L ($L_{br}$) and the last 2M elements of b ($b_t$), normalized using Λ, $[u_{1,(L-M)}, u_{2,(L-M)}, \ldots u_{1,L-1}, u_{2,L-1}]^T = L_{br}^T b_t$.

Approach 2 ("Approximate"):

1. Run the lattice predictor of order M to determine reflection coefficients κ and backward prediction errors b.
2. Create a normalization matrix $\Lambda=R_{bb}^{-1}$ based on the backward prediction error power.
3. Shift/copy data to account for elements of u that are delayed versions of previously calculated elements of u.
4. Run the lattice predictor of order M with b as the input to obtain the forward prediction-error vector f'.
5. Compute the first two elements of u to be the first two elements of f' pre-multiplied with the normalization matrix Λ.

In light of the amount of data movement involved in the first approach, it is believed to be most suitably implemented in software. For example, a general-purpose processor can be programmed to implement the u calculator 208 and the weight updater 216 (and other modules, if desired).

Using the first approach, implementation of the lattice predictor can be performed in about 25M+5 multiplications. The Levinson-Durbin algorithm can be performed in about 8M(M−1) multiplications. Updating u(n) takes about $6M^2$+26M+8 multiplications. Finally, updating the transversal filter coefficients takes about 4N multiplications. Accordingly, a total of about $14M^2$+43M+13+4N multiplications (plus about the same number of additions) can be sufficient to perform the filter.

Although the second approach provides a less exact solution than that described previously, it may be efficiently implemented in hardware. For example, the u calculator 208 and the weight updater 216 (and other modules, if desired) can be implemented in hardware, such as a field programmable gate array and/or application specific integrated circuit.

The approximation allows simplification over the first approach, as the Levinson-Durbin algorithm is eliminated, and a forward prediction-error filter used instead which can be performed in about 8M+8 multiplications. Thus, the second approach can be implemented using about 33M+13+4N multiplications.

Figure 5:
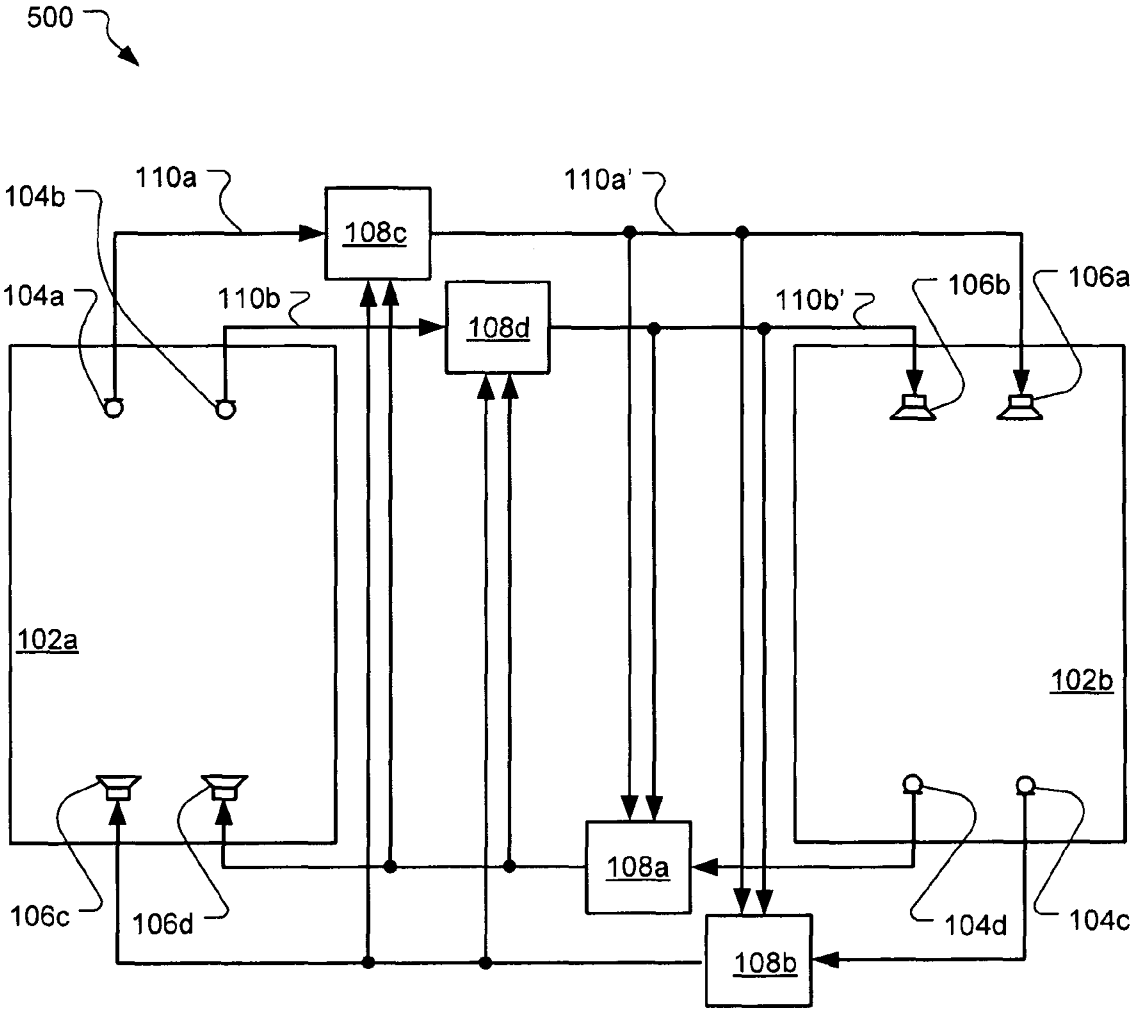
FIG. 5 is a block diagram of a teleconferencing system having two-way multi-channel echo cancellation in accordance with some embodiments of the present invention.

While the discussion to this point has described one-way echo cancellation, it is to be appreciated that echo-cancellation can be provided in both directions. Accordingly, FIG. 5 illustrates a teleconferencing system 500 incorporating two-way echo cancellation in accordance with some embodiments of the present invention. Elements in FIG. 5 can be generally similar to those of FIG. 1 and operate in a similar manner. Echo cancellation can be provided for echoes generated in the second acoustic space **102*b* by a first plurality of adaptive filters 108*a*, 108*b*. Echo cancellation can be provided for echoes generated in the first acoustic space 102*a* by a second plurality of adaptive filters 108*c*, 108*d* to produce echo-reduced first electronic signals 110*a*', 110*b*'**. Operation of the adaptive filters can be as described above.

While FIG. 1 and FIG. 5 illustrate each of the plurality of adaptive filters 108 as separate blocks, it is to be appreciated that a plurality of adaptive filters can be implemented using common components. The adaptive filters can be implemented, for example, using hardware, software, or a combination of hardware and software. More particularly, the adaptive filter can include discrete digital logic, field programmable gate arrays, application specific integrated circuits, like elements, and combinations thereof. The adaptive filter can be implemented in software in the form of computer executable code stored within a computer readable memory in the form of object or interpretable code for execution using a general-purpose processor, digital signal processor, or similar computer. Various forms of computer readable memory can be used, including for example, electronic, magnetic, optical, and other types of memory.

While an entire teleconferencing system has been described above, it is to be appreciated that an acoustic echo cancellation system need not include all of the above elements. For example, an acoustic echo cancellation system can include an adaptive filter as described above. The adaptive filter can include an input interface for accepting reference signals and an electronic audio signal and can include an output interface for providing an echo-reduced version of the electronic audio signal.

Figure 6:
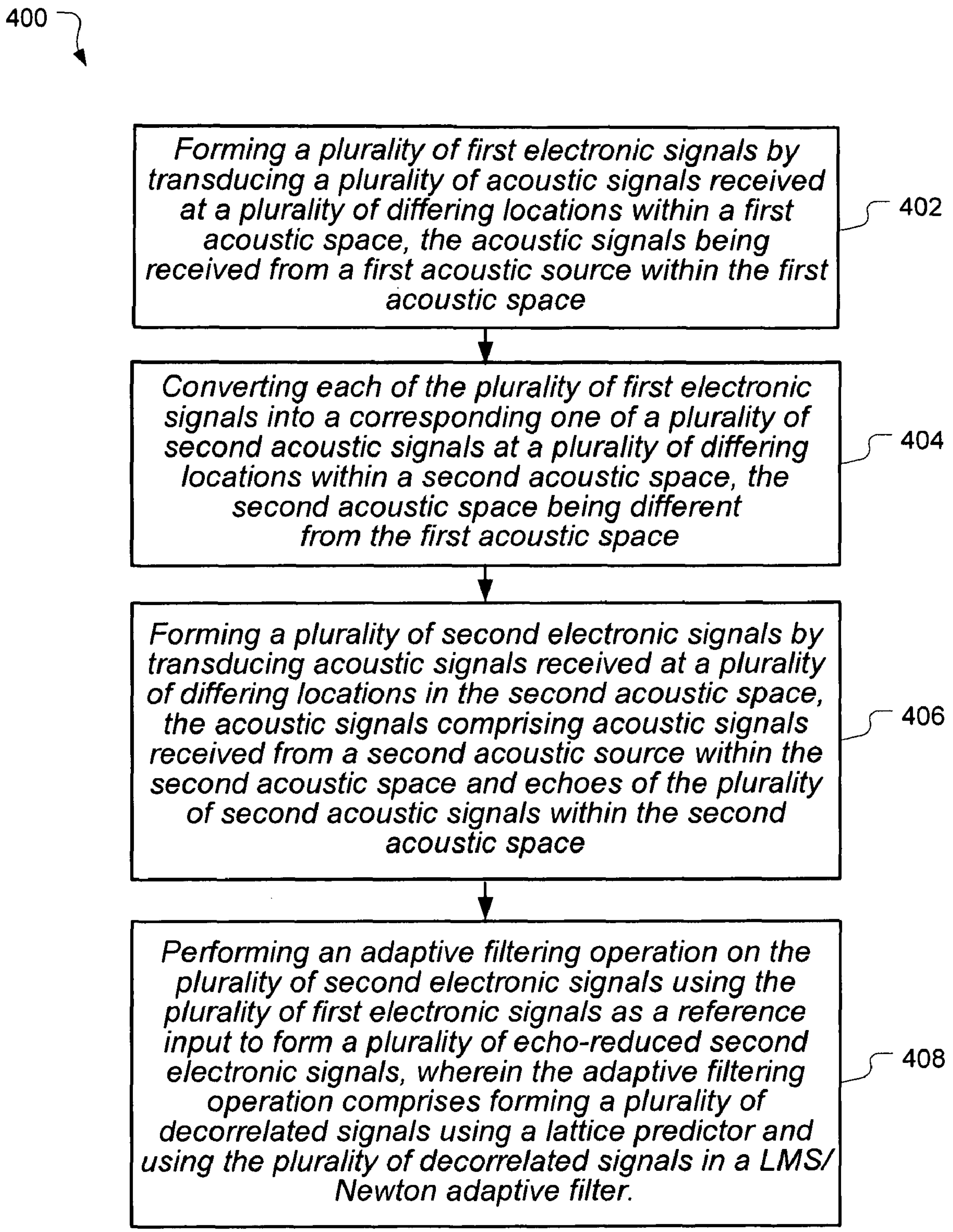
FIG. 6 is a flow chart of a method for multi-channel echo cancellation in accordance with some embodiments of the present invention.

A method of multi-channel acoustic echo cancellation is shown in flow chart form in FIG. 6. The method 400 can include forming 402 a plurality of first electronic signals by transducing acoustic signals received from a first acoustic source at a plurality of differing locations within a first acoustic space. For example, the transducing can be performed by microphones as described above. The method can also include converting 404 each of the plurality of first electronic signals into a corresponding one of a plurality of second acoustic signals at a plurality of differing locations within a second acoustic space different from the first acoustic space. For example, the converting can be performed by speakers as described above.

Another operation of the method 400 can include forming 406 a plurality of second electronic signals by transducing acoustic signals received at a plurality of differing locations in the second acoustic space. For example, the transducing can be performed by microphones as described above. The acoustic signals can include acoustic signals received from a second acoustic source within the second acoustic space and echoes of the plurality of second acoustic signals within the second acoustic space.

The method 400 can include performing 408 an adaptive filtering operation on the plurality of second electronic signals using the plurality of first electronic signals as a reference input. The adaptive filtering can form a plurality of echo-reduced second acoustic signals. For example, as described above, the adaptive filtering operation can include forming a plurality of decorrelated signals using a lattice predictor and using the plurality of decorrelated signals in an LMS/Newton filter.

The echo-reduced second electronic signals can also be converted into acoustic signals in the first acoustic space, for example, using speakers as described above.

The method can be performed at multiple locations to implement multiple echo cancellers, for example to provide two-way echo cancellation as described above.

During testing using a simulation, it has been found that satisfactory performance of the lattice predictor was obtained with an order of M=8 for simulated echo paths modeled as length N=1024 independent, zero-mean Gaussian sequences with variance decaying at a rate of 1/n, wherein n is the sample number. It will be appreciated, however, that the invention is not limited to these values, and different values can be used and may provide better or worse performance in different scenarios.

Another measure of an acoustic echo cancellation system is misalignment: the difference between the actual echo response and the estimate obtained by the adaptive filter. It has also been observed that using the present techniques reduced misalignment can be obtained as compared to previously reported results (e.g. XN-NLMS and leaky XLMS). This can be helpful when the echo responses change, for example, when the acoustic source changes (e.g., one person stops talking and a second person starts talking). This is because the acoustic paths between the acoustic source (person) and the microphones are different. When this occurs, the LMS/Newton filter readapts to the new echo situation. Faster adaptation as compared to prior approaches such as normalized LMS, XM-NLMS, and leaky XLMS.

It will be appreciated that the lattice predictor and LMS/Newton adaptive filter can perform linear operations. Accordingly, non-linear distortions of the audio signals can be avoided. In particular, addition of non-linear products or the addition of noise into the signals to provide decorrelation can be avoided. However, if desired, noise or non-linear distortion can also be introduced into the signals, and additional improvement obtained.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A multi-channel acoustic echo cancellation system comprising:

a plurality of first microphones disposed within a first acoustic space and configured to generate a plurality of first electronic signals, the plurality of first electronic signals derived from acoustic signals received from a first acoustic source within the first acoustic space;

a plurality of speakers disposed within a second acoustic space and coupled to the plurality of first microphones to generate a plurality of second acoustic signals corresponding to the plurality of first electronic signals;

a plurality of second microphones disposed within the second acoustic space and configured to generate a plurality of second electronic signals, the second electronic signals derived from acoustic signals received from a second acoustic source within the second acoustic space and echoes of the plurality of second acoustic signals generated within the second acoustic space; and an adaptive filter coupled to the plurality of second microphones and configured to adaptively filter the plurality of second electronic signals to form a plurality of echo-reduced second electronic signals using the plurality of first electronic signals as a reference, wherein the adaptive filter comprises a lattice predictor of order M configured to provide an error-prediction vector and reflection coefficient data to an LMS/Newton adaptive filter of length N, wherein M<N, said multi-channel acoustic echo cancellation system further configured such that the plurality of second electronic signals are input into a backward error predictor and the output of the backward predictor is input into a forward prediction error filter and the output of the forward prediction error filter corresponds to a u vector representing a multiplication of the inverse of a correlation matrix and a signal vector, thereby precluding the need to derive an inverse of the correlation matrix.

2. The system of claim 1, wherein the lattice predictor provides a plurality of uncorrelated inputs to the LMS/Newton adaptive filter.

3. The system of claim 1, wherein the LMS/Newton adaptive filter comprises:

an updater configured to use a backward prediction-error vector from the lattice predictor to estimate a u vector; and a weight updater configured to update weights of the LMS/Newton filter using the u vector and one of the plurality of echo-reduced second electronic signals; and a transversal filter configured to generate an echo estimate using the weights and the plurality of second electronic signals.

4. The system of claim 1, further comprising a plurality of second speakers disposed within the first acoustic space and coupled to the adaptive filter to form a plurality of third acoustic signals corresponding to the plurality of echo-reduced second electronic signals.

5. The system of claim 4, further comprising a second adaptive filter coupled to the plurality of first microphones and configured to adaptively filter the plurality of first electronic signals to form a plurality of echo-reduced first electronic signals using the plurality of second electronic signals as a reference, wherein the second adaptive filter comprises a second lattice predictor of order M coupled to a second LMS/Newton adaptive filter of length N, wherein M<N.

6. The system of claim 1, wherein the adaptive filter comprises two channels.

7. A method of multi-channel acoustic echo cancellation, comprising:

forming a plurality of first electronic signals by transducing a plurality of acoustic signals received at a plurality of differing locations within a first acoustic space, the acoustic signals being received from a first acoustic source within the first acoustic space;

converting each of the plurality of first electronic signals into a corresponding one of a plurality of second acoustic signals at a plurality of differing locations within a second acoustic space, the second acoustic space being different from the first acoustic space;

forming a plurality of second electronic signals by transducing acoustic signals received at a plurality of differing locations within the second acoustic space, the acoustic signals comprising acoustic signals received from a second acoustic source within the second acoustic space and echoes of the plurality of second acoustic signals within the second acoustic space; and performing an adaptive filtering operation on the plurality of second electronic signals using the plurality of first electronic signals as a reference input to form a plurality of echo-reduced second electronic signals, wherein the adaptive filtering operation comprises forming a plurality of decorrelated signals using a lattice predictor and using the plurality of decorrelated signals in a LMS/Newton adaptive filter, wherein said multi-channel acoustic echo cancellation system is further configured such that the plurality of second electronic signals are input into a backward error predictor and the output of the backward predictor is input into a forward prediction error filter and the output of the forward prediction error filter corresponds to a u vector representing a multiplication of the inverse of a correlation matrix and a signal vector, thereby precluding the need to derive an inverse of the correlation matrix.

8. The method of claim 7, wherein the using the plurality of decorrelated signals comprises:

forming a u vector using a backward prediction-error vector obtained from the lattice predictor; and updating weights of the LMS/Newton adaptive filter by forming the product of the u vector and the echo-reduced second electronic signals.

9. The method of claim 8, wherein the forming a u vector comprises:

converting reflection coefficients obtained from the lattice predictor into backward predictor coefficients; and multiplying the backward prediction-error vector by a matrix of the backward predictor coefficients to obtain the u vector.

10. The method of claim 8, wherein the forming a u vector comprises:

forming a first portion of the u vector using the backward prediction-error vector; and forming a second portion of the u vector using a forward prediction-error vector obtained from the lattice predictor.

11. The method of claim 8, further comprising normalizing the backward prediction-error vector.

12. The method of claim 7, further comprising converting each of the plurality of echo-reduced second acoustic signals into a corresponding one of a plurality of third acoustic signals at a plurality of differing locations within the first acoustic space.

13. The method of claim 7, further comprising performing a second adaptive filtering operation on the plurality of first electronic signals using the plurality of second electronic signals as a reference input to form a plurality of echo-reduced first electronic signals, wherein the adaptive filtering operation comprises forming a plurality of second decorrelated signals using a second lattice predictor and using the plurality of second decorrelated signals in a LMS/Newton adaptive filter.

14. A system for multi-channel acoustic echo cancellation, comprising:

means for forming a plurality of first electronic signals by transducing a plurality of acoustic signals received at a plurality of differing locations within a first acoustic space, the acoustic signals received from a first acoustic source within the first acoustic space;

means for converting each of the plurality of first electronic signals into a corresponding one of a plurality of second acoustic signals at a plurality of differing locations within a second acoustic space, the second acoustic space being different from the first acoustic space;

means for forming a plurality of second electronic signals by transducing acoustic signals received at a plurality of differing locations within the second acoustic space, the acoustic signals comprising acoustic signals received from a second acoustic source within the second acoustic space and echoes of the plurality of second acoustic signals within the second acoustic space;

means for forming a plurality of decorrelated signals from the second electronic signals using the plurality of first electronic signals as a reference input; and means for using the plurality of decorrelated signals in a LMS/Newton adaptive filter to form a plurality of echo-reduced second electronic signals, wherein said multi-channel acoustic echo cancellation system is further configured such that the plurality of second electronic signals are input into a backward error predictor and the output of the backward predictor is input into a forward prediction error filter and the output of the forward prediction error filter corresponds to a u vector representing a multiplication of the inverse of a correlation matrix and a signal vector, thereby precluding the need to derive an inverse of the correlation matrix.

15. The system of claim 14, wherein the means for using the plurality of decorrelated signals comprises:

means for estimating a u vector corresponding to an estimate of a product of the inverse autocorrelation matrix of the reference input and the reference input, wherein the means for estimating uses a backward prediction-error vector obtained from the means for forming a plurality of decorrelated signals; and means for updating weights of the LMS/Newton adaptive filter using the u vector.

16. The system of claim 15, wherein the means for estimating a u vector comprises:

means for converting reflection coefficients into backward predictor coefficients, wherein the reflection coefficients are obtained from the means for forming a plurality of decorrelated signals; and means for multiplying the backward prediction-error vector by a matrix of the backward predictor coefficients to obtain the u vector.

17. The system of claim 15, wherein the means for estimating a u vector comprises:

means for forming a first portion of the u vector using the backward prediction-error vector; and means for forming a second portion of the u vector using a forward prediction-error vector obtained from the means for forming a plurality of decorrelated signals.

18. The system of claim 15, further comprising means for normalizing the backward prediction-error vector.

19. The system of claim 14, further comprising means for converting each of the plurality of echo-reduced second electronic signals into a corresponding one of a plurality of third acoustic signals at a plurality of differing locations within the first acoustic space.

20. The system of claim 14, further comprising:

means for forming a plurality of second decorrelated signals using the plurality of second electronic signals as a reference input; and means for using the plurality of second decorrelated signals in a LMS/Newton adaptive filter to form a plurality of echo-reduced first electronic signals.

* * * * *